(12) United States Patent
Slane et al.

(10) Patent No.: US 12,351,342 B2
(45) Date of Patent: Jul. 8, 2025

(54) EXTRUDED ELASTOMERIC SURFACE OR EROSION PLYS

(71) Applicant: GOODRICH CORPORATION, Charlotte, NC (US)

(72) Inventors: Casey M Slane, Tallmadge, OH (US); Jin Hu, Cary, NC (US); Nathaniel Ching, Hartville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/332,641

(22) Filed: Jun. 9, 2023

(65) Prior Publication Data

US 2023/0322409 A1    Oct. 12, 2023

Related U.S. Application Data

(62) Division of application No. 16/663,989, filed on Oct. 25, 2019, now Pat. No. 11,713,137.

(51) Int. Cl.
*B64D 15/00* (2006.01)
*B32B 5/02* (2006.01)
(Continued)

(52) U.S. Cl.
CPC .............. *B64F 5/10* (2017.01); *B32B 5/024* (2013.01); *B32B 7/12* (2013.01); *B32B 15/08* (2013.01); *B32B 25/08* (2013.01); *B32B 27/08* (2013.01); *B32B 27/12* (2013.01); *B32B 37/12* (2013.01); *B64D 15/00* (2013.01); *B32B 2037/1253* (2013.01); *B32B 37/182* (2013.01); *B32B 2307/734* (2013.01); *B32B 2309/105* (2013.01); *B32B 2605/18* (2013.01)

(58) Field of Classification Search
CPC ...... B64D 15/00; B64D 15/16; B64D 15/166; B64D 45/00; B64F 5/10; B64C 1/064; B64C 1/12; B29L 2031/3082; B29L 2031/3085
USPC ................................ 244/133, 134 A, 134 E
See application file for complete search history.

(56) References Cited

U.S. PATENT DOCUMENTS 3,359,687 A    12/1967  Wallace
8,444,093 B1    5/2013  Epstein
(Continued)

FOREIGN PATENT DOCUMENTS

CN          204433027         7/2015
DE         102015113471        2/2017
(Continued)

OTHER PUBLICATIONS

European Patent Office, European Search Report dated Mar. 22, 2021 in Application No. 20202022.8.
(Continued)

*Primary Examiner* — John L Goff, II
(74) *Attorney, Agent, or Firm* — SNELL & WILMER L.L.P.

(57) ABSTRACT

A method for forming an aircraft component includes forming an inner portion of the aircraft component. The method further includes forming an outer layer of the aircraft component using extrusion of an elastomeric material. The method further includes coupling the outer layer of the aircraft component to the inner portion of the aircraft component.

3 Claims, 3 Drawing Sheets

(51) Int. Cl.
  *B32B 7/12* (2006.01)
  *B32B 15/08* (2006.01)
  *B32B 25/08* (2006.01)
  *B32B 27/08* (2006.01)
  *B32B 27/12* (2006.01)
  *B32B 37/12* (2006.01)
  *B64F 5/10* (2017.01)
  *B32B 37/18* (2006.01)

(56) References Cited

U.S. PATENT DOCUMENTS

| | | | |
|---|---|---|---|
| 8,876,051 B2* | 11/2014 | Stewart | B64C 1/38 |
| | | | 244/130 |
| 9,669,601 B2 | 6/2017 | Marx et al. | |
| 9,771,866 B2 | 9/2017 | Pujar et al. | |
| 10,240,578 B2 | 3/2019 | Behmer et al. | |
| 10,336,435 B2 | 7/2019 | Kumar et al. | |
| 2006/0243860 A1* | 11/2006 | Kismarton | B29C 66/112 |
| | | | 244/132 |
| 2009/0096687 A1 | 4/2009 | Gentilman et al. | |
| 2012/0091277 A1 | 4/2012 | Marx et al. | |
| 2013/0157027 A1 | 6/2013 | Marx et al. | |
| 2015/0330231 A1 | 11/2015 | McGuire et al. | |
| 2016/0251072 A1 | 9/2016 | Marx et al. | |

FOREIGN PATENT DOCUMENTS

| | | |
|---|---|---|
| EP | 3098167 | 11/2016 |
| EP | 3199451 | 8/2017 |
| WO | WO-2005095090 A1 * | 10/2005 ............. B29C 65/02 |
| WO | 2015094917 | 6/2015 |
| WO | 2019060284 | 3/2019 |

OTHER PUBLICATIONS

European Patent Office, European Office Action dated Sep. 21, 2022 in Application No. 20202022.8.
USPTO; Requirement for Restriction dated May 3, 2021 in U.S. Appl. No. 16/663,989.
USPTO; Preinterview First Office Action dated Oct. 1, 2021 in U.S. Appl. No. 16/663,989.
"Ask the Captain: Can it be too hot or cold to fly?" from usatoday.com as captured by archive.org Sep. 2014.
USPTO; First Action Interview Office Action dated Nov. 22, 2021 in U.S. Appl. No. 16/663,989.
USPTO; Final Office Action dated Apr. 11, 2022 in U.S. Appl. No. 16/663,989.
USPTO; Advisory Action dated Jun. 27, 2022 in U.S. Appl. No. 16/663,989.
USPTO; Non-Final Office Action dated Sep. 30, 2022 in U.S. Appl. No. 16/663,989.
USPTO; Final Office Action dated Jan. 30, 2023 in U.S. Appl. No. 16/663,989.
USPTO; Notice of Allowance dated Mar. 15, 2023 in U.S. Appl. No. 16/663,989.
European Patent Office, European Office Action dated Dec. 15, 2023 in Application No. 20202022.8.

* cited by examiner

EXTRUDED ELASTOMERIC SURFACE OR EROSION PLYS

CROSS REFERENCE TO RELATED APPLICATIONS

This application is a divisional of, and claims priority to and the benefit of, U.S. patent application Ser. No. 16/663,989, filed Oct. 25, 2019, now U.S. Pat. No. 11,713,137, entitled "EXTRUDED ELASTOMERIC SURFACE OR EROSION PLYS," which is incorporated by reference herein in its entirety for all purposes.

FIELD

The present disclosure relates to aircraft components and, more specifically, to aircraft components having relatively thin layers of elastomeric materials.

BACKGROUND

Elastomeric sheets may be used in aerospace applications. Such elastomeric sheets may be used to protect external components such as leading-edge surfaces, radomes, engine fan blades, and ice protection equipment. Conventional elastomeric processes, such as calendering, may fail to make relatively thin elastomeric sheets (e.g., less than 50 thousandths of an inch (1.3 millimeters) and/or greater than 0.00039 thousandths of an inch (10 nanometers)). Due to this limitation, it is difficult to reduce a weight of aerospace components with conventionally-formed elastomeric sheets (any reduction in weight of an aerospace component is desirable). This limitation further reduces or eliminates the possibility of stacking multiple elastomeric sheets together such that any defect (e.g., voids, thin or thick spots, bubbles, or the like) in an elastomeric sheet is likely to affect an entire thickness of the sheet.

SUMMARY

Disclosed herein is a method for forming an aircraft component. The method includes forming an inner portion of the aircraft component. The method further includes forming an outer layer of the aircraft component using extrusion of an elastomeric material. The method further includes coupling the outer layer of the aircraft component to the inner portion of the aircraft component.

In any of the foregoing embodiments, coupling the outer layer of the aircraft component to the inner portion of the aircraft component includes applying an adhesive between the outer layer and the inner portion.

In any of the foregoing embodiments, forming the outer layer of the aircraft component includes forming multiple outer layers of the aircraft component using the extrusion for each of the multiple outer layers.

In any of the foregoing embodiments, the extrusion includes at least one of the extrusion of each of the multiple layers separately or the extrusion of each of the multiple layers simultaneously.

In any of the foregoing embodiments, the outer layer has a total thickness of between 2 thousandths of an inch (0.051 millimeters (mm)) and 40 thousandths of an inch (1.0 mm).

In any of the foregoing embodiments, the elastomeric material is capable of retaining its physical properties at temperatures between −100 degrees Fahrenheit (F, −73.3 degrees Celsius (C)) and 350 degrees F. (177 degrees C.).

In any of the foregoing embodiments, the aircraft component includes at least one of an erosion film, a pneumatic deicer, an electrothermal deicer, or a heated elastomer product.

In any of the foregoing embodiments, the elastomeric material includes at least one of a natural rubber, an elastomer, or a plastic.

In any of the foregoing embodiments, the inner portion of the aircraft component includes at least one of an adhesive, an elastomer, a rubber, a neoprene, a metal, or a woven fabric.

In any of the foregoing embodiments, the extrusion includes at least one of blown extrusion or cast extrusion.

Also disclosed is a method for forming an aircraft component. The method includes forming an inner portion of the aircraft component. The method further includes forming multiple outer layers of the aircraft component, each of the multiple outer layers being formed from an elastomeric material using extrusion. The method further includes coupling the multiple outer layers of the aircraft component to the inner portion of the aircraft component.

In any of the foregoing embodiments, coupling the multiple outer layers of the aircraft component to the inner portion of the aircraft component includes applying an adhesive between the outer layer and the inner portion.

In any of the foregoing embodiments, the extrusion includes at least one of the extrusion of each of the multiple layers separately or the extrusion of each of the multiple layers simultaneously.

In any of the foregoing embodiments, each of the multiple outer layers have a thickness of between 2 thousandths of an inch (0.051 millimeters (mm)) and 40 thousandths of an inch (1.0 mm).

In any of the foregoing embodiments, the elastomeric material is capable of retaining its physical properties at temperatures between −100 degrees Fahrenheit (F, −73.3 degrees Celsius (C)) and 350 degrees F. (177 degrees C.).

Also disclosed is an aircraft component. The aircraft component includes an inner portion. The aircraft component further includes an outer layer formed from an elastomeric material using an extrusion process.

In any of the foregoing embodiments, the outer layer includes multiple outer layers formed using the extrusion process.

In any of the foregoing embodiments, each of the multiple outer layers has a thickness of between 2 thousandths of an inch (0.051 millimeters (mm)) and 40 thousandths of an inch (1.0 mm).

Any of the foregoing embodiments may further include an adhesive located between the inner portion and the outer layer and configured to retain the outer layer in place relative to the inner portion.

In any of the foregoing embodiments, the elastomeric material includes at least one of a natural rubber, an elastomer, or a plastic.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
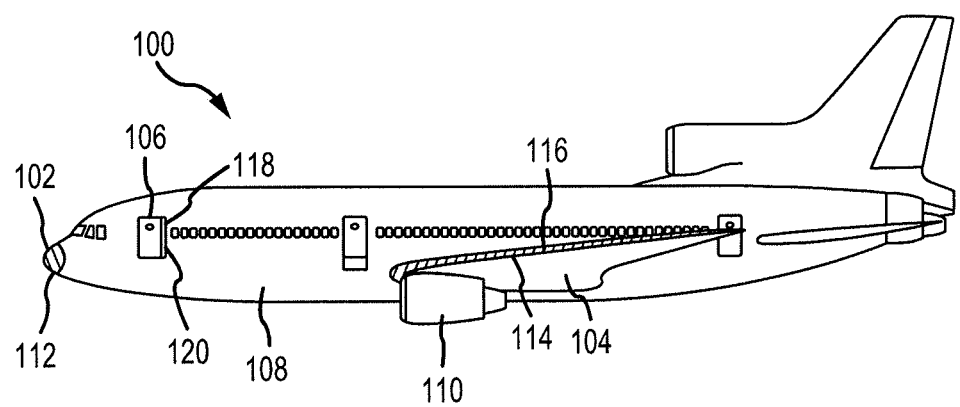
FIG. 1 illustrates an aircraft including various components having an elastomeric outer layer, in accordance with various embodiments.

Referring now to FIG. 1, an aircraft 100 may include multiple aircraft components. For example, the aircraft 100 may include a nosecone 102, one or more wing 104, one or more door 106, a fuselage 108, and one or more gas turbine engine 110. These and other components of the aircraft 100 may include, or be coupled to, additional aircraft components. For example, the nosecone 102 may include an erosion film 112 on an outer surface thereof, the wing 104 may have a leading edge 114 with a pneumatic or electrothermal deicer 116, and the door 106 may have a seal 118 formed from a heated elastomer product 120. Each of the erosion film 112, the pneumatic or electrothermal deicer 116, and the heated elastomer product 120 may have an inner portion which may face an interior of the component (e.g., the inner portion of the erosion film 112 may face the nosecone 102, the inner portion of the pneumatic or electrothermal deicer 116 may face the wing 104, and the inner portion of the heated elastomer product 120 may face the door 106 or the fuselage 108). Each of the erosion film 112, the pneumatic or electrothermal deicer 116, and the heated elastomer product 120 may further include an outer layer. The outer layer may be formed from, or may include, an elastomeric material and may be formed using an extrusion process. In various embodiments, the outer layer may face an environment of the aircraft component. For example, the outer portion of the erosion film may face oncoming air, the outer portion of the electrothermal deicer 116 may face oncoming air, and the outer portion of the heated elastomer product 120 may face air in response to the door 106 being opened.

Using extrusion to form an elastomeric outer layer may provide several benefits and advantages over forming an elastomeric outer layer using a conventional method. For example, the use of extrusion allows the outer layer to be relatively thin, thus reducing weight of the aircraft component. Because extrusion allows for the formation of thinner layers, multiple layers may be stacked together to form a desired thickness of the total outer layer. The ability to stack multiple layers together provides benefits such as reducing the likelihood of defects (e.g., cracks, pores, or the like) extending through the outer layer, and simultaneously increasing the likelihood of uniformity of thickness of the outer layer. Thus, the use of extrusion results in a more robust product with an extended operating life and potentially having a lower weight, all desirable characteristics for aircraft components.

Figure 2:
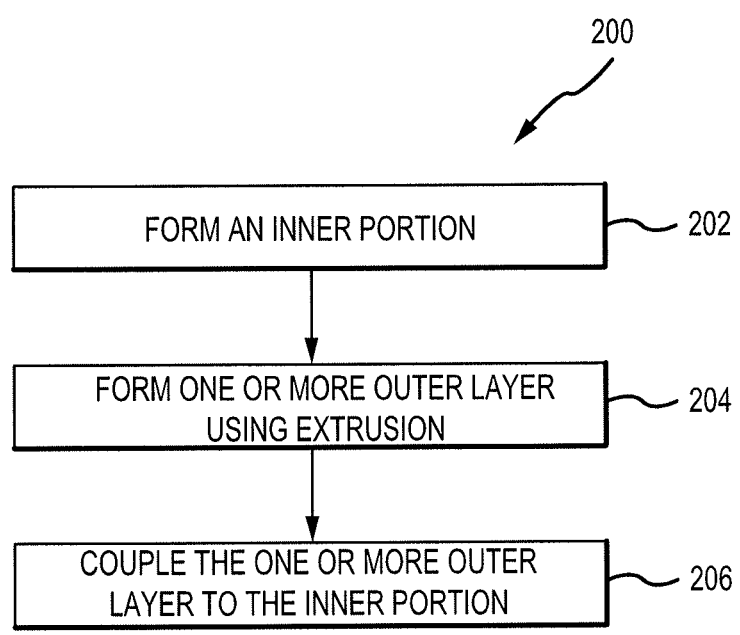
FIG. 2 is a flowchart illustrating a method for forming an aircraft component with an inner portion and an outer layer, in accordance with various embodiments.

Turning to FIG. 2, a method 200 for forming an aircraft component having an elastomeric surface or erosion ply is shown. The method 200 may begin in block 202 where an inner portion of the aircraft component is formed. The inner portion of the aircraft component may be formed using any method such as casting, forging, or the like. The inner portion may be formed to have any desirable shape including straight lines, angles, curves, or the like on at least one of edges or surfaces. The inner portion may include at least one of an adhesive, an elastomer, a rubber, a neoprene, a metal, or a woven fabric.

In block 204, one or more outer layer may be formed using an extrusion process. The outer layer may include an elastomeric material and may include one or multiple plies (i.e., multiple outer layers) coupled together. In embodiments in which the outer layer includes multiple plies, each of the multiple plies may be formed using the extrusion process. The extrusion process may include any type of extrusion such as blown extrusion or cast extrusion. The outer layer (whether one or multiple plies) may be formed to have a shape that corresponds to a shape of an outer surface of the inner portion. In some embodiments, the outer layer may be formed via extrusion into a sheet structure and cut or otherwise reduced to a desired shape, or may be formed via extrusion to have a desired shape of the final outer layer.

Blown extrusion, which may be referred to as blown film extrusion, is a process of extrusion of molten materials and constant inflation of the material to several times its initial diameter. This may result in a thin, tubular product which may be slit to create a flat film. The extrusion may be done via an annular slit die, generally vertically, for the formation of a thin-walled tube. The introduction of air takes place through a hole present in the die's center for blowing up the tube just like a balloon. The cooling of the hot film is done by the high-speed air ring that blows onto it. This air ring is mounted on the top of die.

Cast extrusion includes a molten polymer that travels through a flat die system to adopt its final flat film shape. The die system is formed by the die and feedblock (if the process requires coextrusion) or simply the die, if the process is that of mono-layer extrusion. The process starts with the feeding of plastic resins by means of a gravimetric feeding system to one or more extruders. The materials are then melted and mixed by the extruders, filtered and fed to the die system. Immediately after exiting the die, the molten curtain enters the cooling unit where its temperature is lowered with a water-cooled chill roll to "freeze" the film. The film is then passed downstream where the edges are trimmed, corona treatment is applied (if a fabrication process such as printing or coating is required) and the film is wound into rolls.

In block 206, the one or more outer layer may be coupled to the inner portion. The one or more outer layer may be coupled to the inner portion using any technique such as adhesive, fasteners, an interference or press fit, or the like.

Figure 3A:
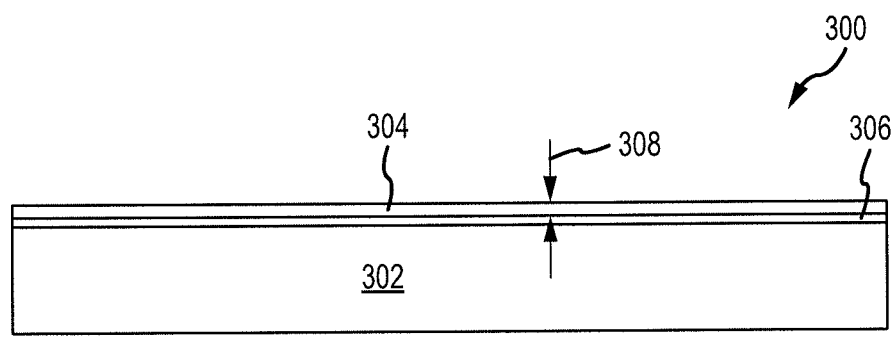
FIG. 3A illustrates an aircraft component with an inner portion and an outer layer, in accordance with various embodiments.

Referring to FIG. 3A, an aircraft component 300 may include an inner portion 302 and an outer layer 304. An adhesive 306 may be applied between the inner portion 302 and the outer layer 304 and used to couple the outer layer 304 to the inner portion 302. In that regard, the adhesive 306 resists separation of the outer layer 304 from the inner portion 302. The adhesive may be heat-cured, chemically-cured, moisture-cured, anaerobic-cured, or the like.

The outer layer 304 may be formed using an extrusion process. In that regard, the outer layer 304 may be formed to have a relatively small thickness 308. For example, the total thickness of the outer layer 304 may be between 1 thousandths of an inch and 100 thousandths of an inch (0.025 millimeters (mm) and 2.5 mm), between 2 thousandths of an inch and 40 thousandths of an inch (0.051 mm and 1.0 mm), or between 2 thousandths of an inch and 20 thousandths of an inch (0.051 mm and 0.51 mm).

The outer layer 304 may include a single ply. The material of the outer layer 304 may include any elastomeric material. For example, the outer layer 304 may include a natural rubber, a synthetic rubber, a silicone, an elastomer, a thermoplastic, a thermoset, a polymeric material, or the like.

Use of the extrusion process results in the outer layer 304 being resistant to a relatively wide range of temperatures. Stated differently, use of the extrusion process results in the outer layer 304 retaining its physical properties in response to being exposed to a relatively wide range of temperatures. For example, the outer layer 304 may be capable of retaining its physical properties in response to being exposed to temperatures between negative one hundred (−100) degrees Fahrenheit (F) and 350 degrees F. (−73.3 degrees Celsius (C) and 177 degrees C.), between −70 degrees F. and 250 degrees F. (−57 degrees C. and 120 degrees C.), or between −50 degrees F. and 200 degrees F. (−46 degrees C. and 93 degrees C.).

Figure 3B:
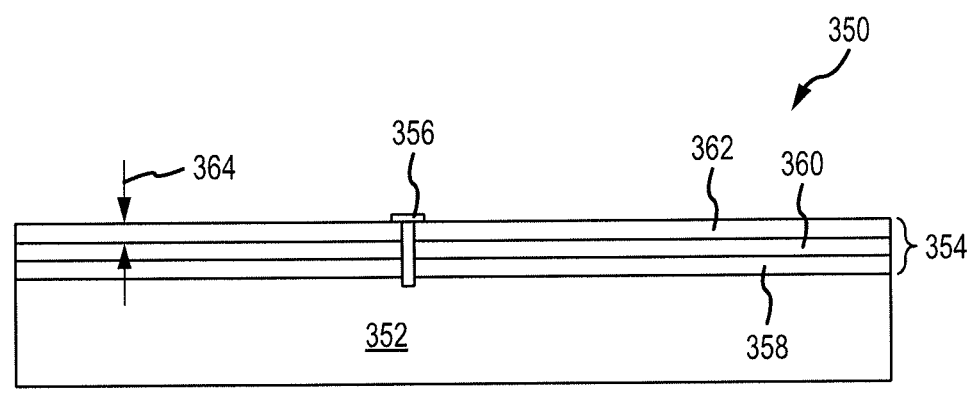
FIG. 3B illustrates an aircraft component with an inner portion and an outer layer having multiple plies, according to various embodiments.

Turning to FIG. 3B, another aircraft component 350 may include an inner portion 352, an outer layer 354, and one or more fasteners 356. Whereas the outer layer 304 of FIG. 3A includes a single ply, the outer layer 354 of FIG. 3B includes multiple plies, or multiple outer layers. In particular, the outer layer 354 includes a first outer layer 358, a second outer layer 360, and a third outer layer 362 stacked on top of each other. The fastener 356 may extend through each of the outer layers 358, 360, 362 and a portion of the inner portion 352 and may fasten each of the outer layers 358, 360, 362 the inner portion 352 together. In various embodiments, an adhesive may be used in addition to, or instead of, the fastener 356 to couple each of the outer layers 358, 360, 362 together.

Each of the outer layers 358, 360, 362 may be formed using an extrusion process, and may have the same or different thicknesses. Each of the outer layers 358, 360, 362 may be formed separately or at the same time using the extrusion process. In some embodiments, a single sheet of outer layer may be formed and may be cut into each of the outer layers 358, 360, 362. In various embodiments, each of the outer layers 358, 360, 362 may be formed as separate parts. In various embodiments, each of the outer layers 358, 360, 362 may be formed from the same or different materials. For example, each of the outer layers 358, 360, 362 may include a natural rubber, or the outer layers 358, 360 may include a natural rubber and the outer layer 362 may include an elastomer. Each of the outer layers 358, 360 may include any one or more of a natural rubber, a synthetic rubber, a silicone, an elastomer, a thermoplastic, a thermoset, a polymeric material, or the like.

Use of the extrusion process allows each of the outer layers 358, 360, 362 to have a relatively small thickness. For example, a thickness 364 of the each of the outer layers 358, 360, 362 may be between 1 thousandths of an inch and 100 thousandths of an inch (0.025 millimeters (mm) and 2.5 mm), between 2 thousandths of an inch and 40 thousandths of an inch (0.051 mm and 1.0 mm), or between 2 thousandths of an inch and 20 thousandths of an inch (0.051 mm and 0.51 mm). Additional outer layers may be added in order to achieve a desired thickness of the combined outer layer 354. Because of the separate outer layers 358, 360, 362, a defect in one of the outer layers (e.g., 358) is limited to that layer, and thus the defect is unlikely to extend through the entire outer layer (including the combination of outer layers 358, 360, 362).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft component, comprising:
    an inner portion; and
    multiple outer layers covering an entirety of an outer surface of the inner portion and formed from an elastomeric material using an extrusion process, wherein the multiple outer layers of the aircraft component are formed by:
        extruding sheets of the elastomeric material forming the multiple outer layers simultaneously;
        stacking the multiple outer layers together;
        forming a desired thickness of the multiple outer layers by repeating the extruding and stacking steps; and
    coupling the multiple outer layers of the aircraft component to the inner portion of the aircraft component by a fastener, wherein the fastener extends through each of the outer layers and a portion of the inner portion, wherein coupling the multiple outer layers of the aircraft component to the inner portion of the aircraft component includes applying an adhesive between each of the multiple outer layers together to form a combined outer layer, and includes applying the adhesive between the combined outer layer and the inner portion.

2. The aircraft component of claim 1, wherein each of the multiple outer layers has a thickness of between 2 thousandths of an inch (0.051 millimeters (mm)) and 40 thousandths of an inch (1.0 mm).

3. The aircraft component of claim 1, wherein the elastomeric material includes at least one of a natural rubber, an elastomer, or a plastic.

* * * * *